United States Patent
Martin et al.

(10) Patent No.: US 8,439,012 B2
(45) Date of Patent: May 14, 2013

(54) METHOD AND SYSTEM FOR ENGINE CONTROL

(75) Inventors: Douglas Raymond Martin, Canton, MI (US); Osama A. Abihana, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/289,713

(22) Filed: Nov. 4, 2011

(65) Prior Publication Data

US 2012/0138016 A1 Jun. 7, 2012

(51) Int. Cl.
*F02P 5/145* (2006.01)
*F02D 11/10* (2006.01)

(52) U.S. Cl.
USPC ............... 123/399; 123/406.23; 123/406.25; 123/406.26

(58) Field of Classification Search .............. 123/399, 123/406.23, 406.25, 406.26
See application file for complete search history.

(56) References Cited

U.S. PATENT DOCUMENTS

| | | | |
|---|---|---|---|
| 4,955,346 A * | 9/1990 | Kaneyasu et al. | 123/399 |
| 5,479,898 A | 1/1996 | Cullen et al. | |
| 6,664,651 B1 | 12/2003 | Kotre et al. | |
| 7,275,518 B1 | 10/2007 | Gartner et al. | |
| 7,463,970 B2 * | 12/2008 | Livshiz et al. | 701/114 |
| 7,748,362 B2 * | 7/2010 | Whitney et al. | 123/406.23 |
| 7,822,528 B2 * | 10/2010 | Whitney et al. | 701/102 |
| 7,980,221 B2 * | 7/2011 | Baur et al. | 123/435 |
| 8,255,139 B2 * | 8/2012 | Whitney et al. | 701/101 |
| 2005/0098152 A1 * | 5/2005 | Surnilla et al. | 123/339.11 |
| 2006/0025904 A1 | 2/2006 | McGee et al. | |
| 2010/0121556 A1 | 5/2010 | Martin | |

* cited by examiner

*Primary Examiner* — Erick Solis
(74) *Attorney, Agent, or Firm* — Julia Voutyras; Alleman Hall McCoy Russell & Tuttle LLP

(57) ABSTRACT

Methods and systems are provided for engine torque control. Mutually exclusive airflow adjustments and spark adjustments are used to provide accurate engine torque control when operating near combustion stability limits. Torque offset values and proportional-integral control terms are adjusted responsive to tip-in/tip-out events to improve torque control response times.

19 Claims, 5 Drawing Sheets

METHOD AND SYSTEM FOR ENGINE CONTROL

FIELD

The present application relates to systems and methods for controlling a vehicle powertrain to provide more accurate torque control.

BACKGROUND/SUMMARY

Vehicle manufacturers continually strive to improve fuel economy and reduce emissions while meeting customer expectations for performance and drivability. The availability of increasingly more powerful powertrain control computers has enabled more precise control of the vehicle powertrain and more efficient use of available energy to power the vehicle and related accessories.

For vehicle powertrains that include an internal combustion engine, either alone or in combination with other power sources (such as in a hybrid vehicle), accurate control of the combustion process is desirable to achieve exhaust emissions and fuel economy goals. As such, to maintain stable combustion under the varying operating conditions, accurate control of engine air and fuel supply is required. For example, air and spark adjustments may be performed in vehicles operating at low-loads, via closed-loop engine speed control, to maintain stable combustion. As such, the combustion stability limit may be defined in terms of an airflow, or a corresponding torque limit. Thus, a minimum engine torque may be set to ensure stable combustion. Such limits help to ensure that the vehicle will not operate in the unstable combustion region, despite variability due to throttle position, engine friction losses, fuel changes, age and wear of engine components, ambient operating conditions, etc.

Various closed-loop or feedback control based approaches may be used to lower vehicle exhaust emissions and improve fuel economy. One example approach for using closed-loop torque is shown by Gartner et al. is U.S. Pat. No. 7,275,518. Therein, a torque difference is adjusted using an engine speed-based torque offset calculation, while also limiting the torque difference by a maximum-engine-torque-available parameter and a minimum-engine-torque-available parameter. As a result, the engine may be operated closer to the minimum torque under varying operating conditions.

However, the inventors herein have identified potential issues with such an approach. As one example, no feedback control of torque may be provided when the requested engine torque is below the minimum torque required for combustion stability. Specifically, as a result of clipping torque at a minimum torque, more or less torque than is required may be provided under some conditions. Consequently, fuel may be wasted during those conditions. Further, the minimum torque includes significant spark retard, thus degrading fuel economy.

The above issues may be at least partly addressed by a method for controlling a vehicle torque, comprising during non-idle speed engine combustion operation, transitioning from air adjustment to spark adjustment to maintain actual engine torque at a desired engine torque when operating at a minimum aircharge for combustion stability. In this way, the desired torque may be accurately provided even when the vehicle is operated at or below minimum load.

In one example, during a tip-out event, torque may be reduced in accordance with a desired torque reduction profile. Therein, when the torque is above the minimum torque (that is, the minimum engine torque required to ensure stable combustion), torque control is achieved using at least airflow control. For example, airflow may be reduced while maintaining an amount of spark retard. Then, when the torque is below the minimum torque, further torque control is achieved using spark control. For example, spark may be retarded from MBT while maintaining the airflow at the minimum aircharge level.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
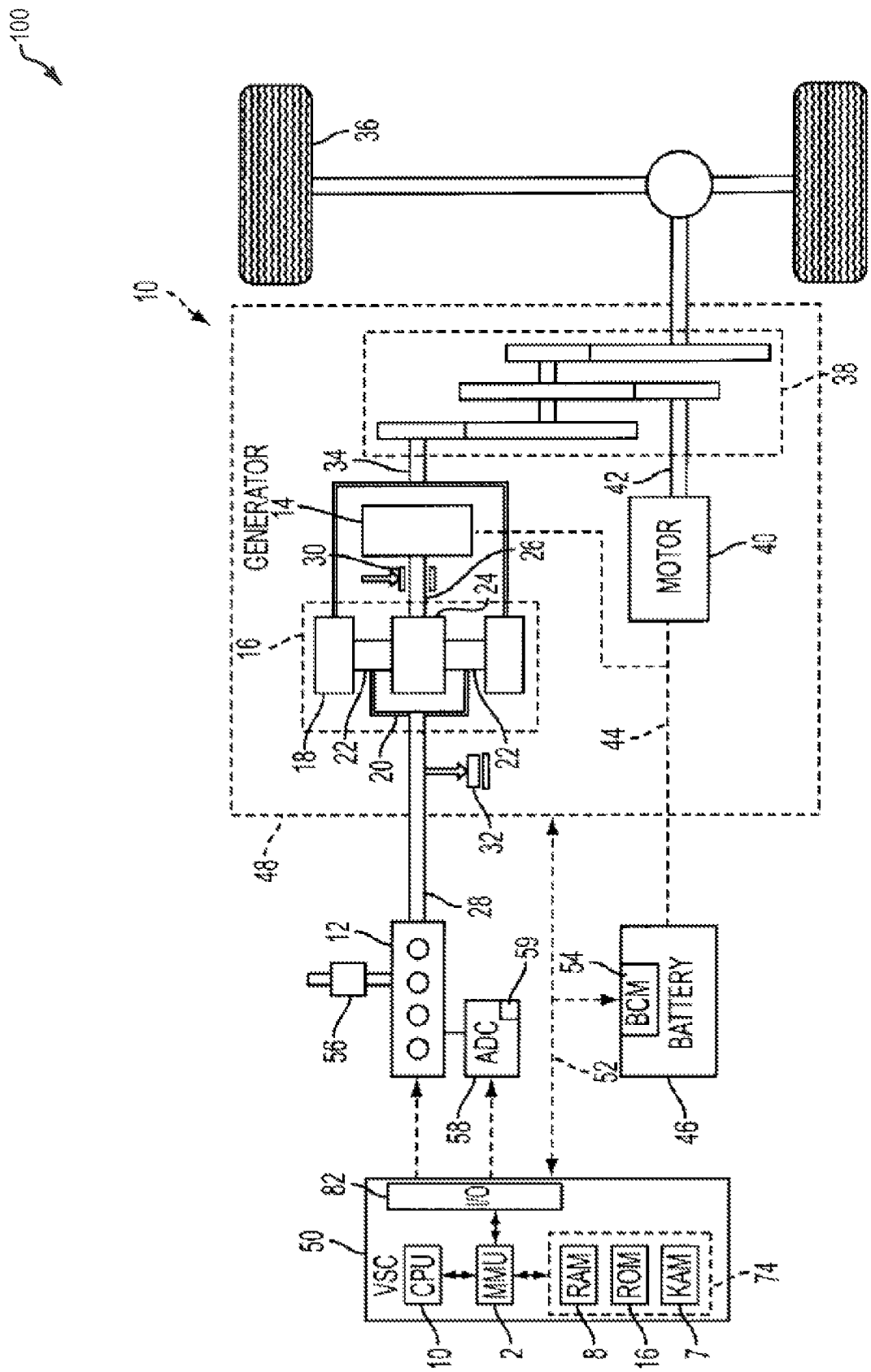
FIG. 1 shows an example powertrain in a hybrid electric vehicle (HEV) system.
Figure 2:
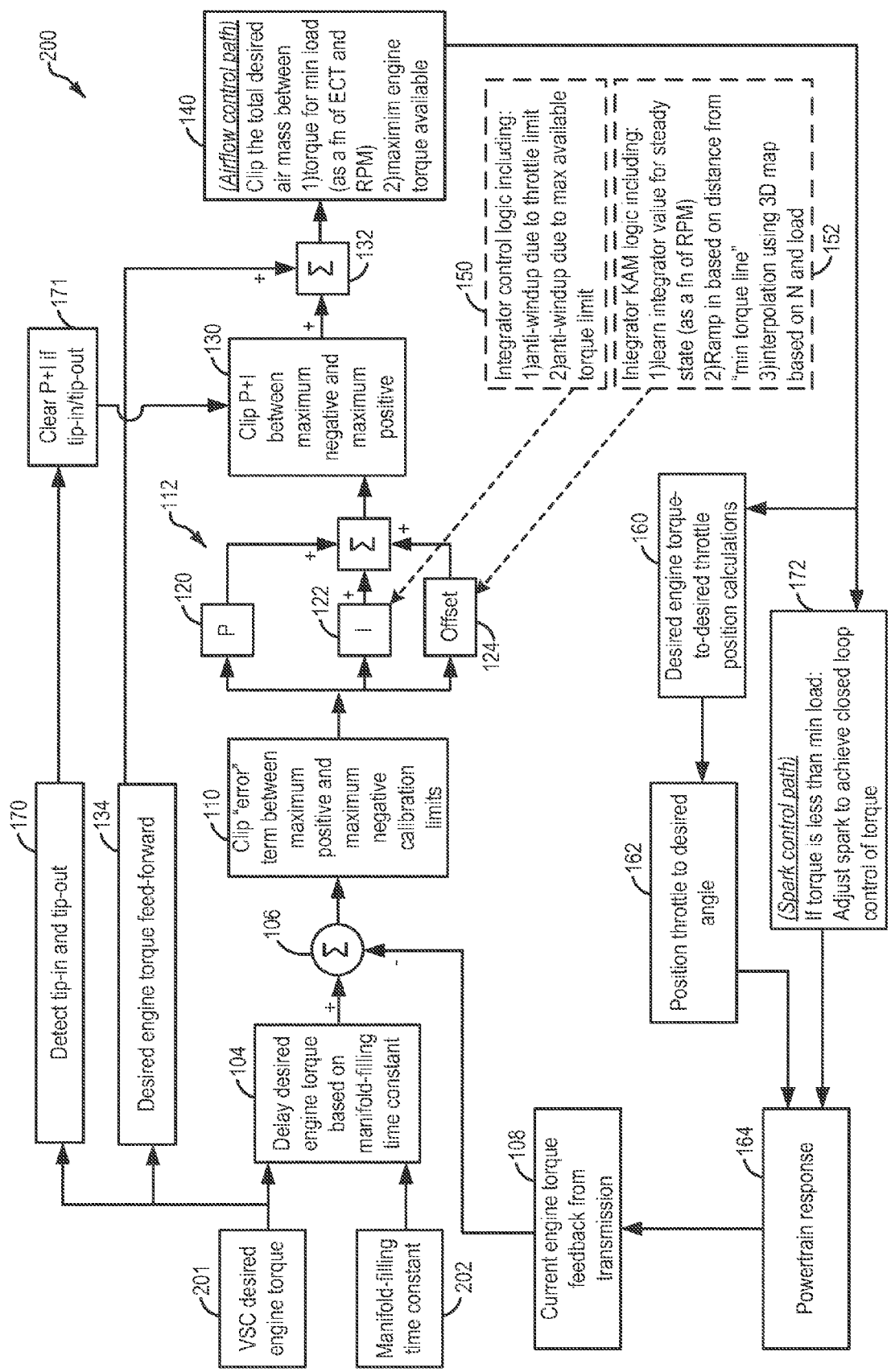
FIG. 2 shows a controller block diagram illustrating operating of a system or method for controlling the vehicle powertrain of FIG. 1.

Methods and systems are provided for adjusting a vehicle powertrain, such as the powertrain of FIG. 1, to enable closed-loop control of engine torque, as shown in FIG. 2. In particular, during conditions of non-idle speed engine combustion, and in response to a tip-out, a controller may transition from a closed-loop air adjustment to a closed-loop spark adjustment to maintain the actual torque at a desired engine torque, when operating at or below a minimum air charge for combustion stability. The controller may be configured to perform routines, such as the example routines of FIGS. 3-4, to transition the adjustments and maintain the desired torque. An example adjustment for reducing torque errors when operating at or below minimum torque loads is illustrated with reference to FIG. 5.

FIG. 1 includes a schematic block diagram representation of a vehicle system 100 to illustrate one embodiment of a system or method for controlling a vehicle powertrain according to the present invention. Vehicle system 100 generally represents any vehicle having a conventional or hybrid electric powertrain with an internal combustion engine (ICE) 12. In the depicted embodiment, the vehicle system 100 is a hybrid electric vehicle (HEV) system wherein the powertrain 11 includes an internal combustion engine, a battery 46, and an electrical machine (e.g., a motor and/or a generator). However, it will be appreciated that in alternate embodiments, the torque control methods discussed herein may be applied to other hybrid vehicle configurations as well as conventional vehicles having an internal combustion engine.

The vehicle powertrain 11 includes engine 12 and an electric machine coupled to the engine via a gearset (herein depicted as generator 14). As such, generator 14 may also be referred to as an electric machine as it may operate as either a motor or a generator. Engine 12 and generator 14 are connected through a power transfer unit or transmission, which in this embodiment is implemented by a planetary gearset 16. As such, other types of power transfer units, including other gearsets and transmissions, may be used to connect engine 12 to generator 14. Planetary gearset 16 includes a ring gear 18, a carrier 20, planet gears 22, and a sun gear 24.

Generator 14 can be used to provide electric current to charge battery 46 or operate motor 40. Alternatively, generator 14 may be operated as a motor to provide an output torque to shaft 26 connected to sun gear 24. Similarly, operation of engine 12 supplies a torque to shaft 28, which is connected to carrier 20. A brake 30 is provided for selectively stopping rotation of shaft 26, thereby locking sun gear 24 in place. Since this configuration allows torque to be transferred from generator 14 to engine 12, a one-way clutch 32 is provided so that shaft 28 rotates in only one direction. In addition, generator 14 can be used to control the rotational speed of engine 12 via planetary gearset 16 and shaft 28 when and if desired.

Ring gear 18 is connected to a shaft 34, which is connected to vehicle drive wheels 36 through a second gearset 38. Vehicle system 100 further includes a motor 40, which can be used to output torque to shaft 42. Motor 40 may also be referred to as an electric machine as it may operate as either a motor or a generator. In particular, battery 46 may be configured to power the electric machine and operate it as a motor. Other vehicles within the scope of the present invention may have different electric machine arrangements, such as more or less than the two electric machines (generator 14 and motor 40) depicted herein. In the embodiment shown in FIG. 1, both electric machines 14, 40 may be operated as motors using electric current from battery 46 or another source of electric current to provide a desired output torque. Alternatively, both electric machines 14, 40 may be operated as generators supplying electrical power to a high voltage bus 44 and/or to an energy storage device, represented by high voltage battery 46. Other types of energy storage devices and/or output devices that can be used include, for example, a capacitor bank, a fuel cell, a flywheel, etc.

As shown in FIG. 1, motor 40, generator 14, planetary gear set 16, and a portion of second gear set 38 may generally be referred to as a transaxle 48. One or more controllers 50 implemented in hardware and/or software are provided to control engine 12 and the components of transaxle 48. In the embodiment of FIG. 1, controller 50 is a vehicle system controller (VSC). Although VSC 50 is shown as a single controller, it may include multiple hardware and/or software controllers. For example, VSC 50 may include a separate powertrain control module (PCM), which could be software embedded within VSC 50, or the PCM could be implemented by a separate hardware device with corresponding software. Those of ordinary skill in the art will recognize that a controller may be implemented by a dedicated hardware device that may include programmed logic and/or an embedded microprocessor executing computer readable instructions to control the vehicle and powertrain. A controller area network (CAN) 52 may be used to communicate control data and/or commands between VSC 50, transaxle 48, and one or more other controllers, such as battery control module (BCM) 54. For example, BCM 54 may communicate data such as battery temperature, state-of-charge (SOC), discharge power limit, and/or other operating conditions or parameters of battery 46. Devices other than battery 46 may also have dedicated controllers or control modules that communicate with VSC 50 to implement control of the vehicle and powertrain. For example, an engine control unit (ECU) may communicate with VSC 50 to control operation of engine 12. In addition, transaxle 48 may include one or more controllers, such as a transaxle control module (TCM), configured to control specific components within 48, such as generator 14 and/or motor 40.

Any or all of the various controllers or control modules, such as VSC 50 and BCM 54 may include a microprocessor based central processing unit (CPU) 10 in communication with a memory management unit (MMU) 2 that manages various computer-readable storage media 74. The computer readable storage media preferably include various types of volatile and non-volatile memory such as a read-only memory (ROM) 16, a random-access memory (RAM) 8, and a keep-alive memory (KAM) 7. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by CPU 10 in controlling the engine, vehicle, or various subsystems. For controller architectures that do not include MMU 2, CPU 10 may communicate directly with one or more storage media 74. CPU 10 communicates with the various sensors and actuators of the engine, vehicle, etc. via an input/output (I/O) interface 82.

Vehicle system 100 may also include one or more emission control devices 56. These may include, for example, a carbon canister for collecting fuel vapors to reduce emissions. From time to time, the carbon canister may be purged, such that collected vapors are taken into the engine air intake system and combusted. Emission control device 56 may also include one or more catalysts or catalytic reactors in various configurations to treat exhaust gases of engine 12. In addition to emissions control or device 56, vehicle system 100 may also include one or more engine or motor driven accessories (AC/DC) 58. Since the accessories 58 use torque produced by engine 12 and/or electrical energy from battery 46 and/or electrical machines 14, 40, one or more of the accessories 58 may be selectively controlled by VSC 50 to more accurately control torque production of engine 12 when operating near the combustion stability limit. For example, an air conditioning system may include a compressor 59 whose operation is adjusted by the controller during selected operating modes to more accurately control operation of engine 12.

Now turning to FIG. 2, map 200 shows a block diagram illustrating an embodiment of a system or method for controlling the vehicle powertrain of FIG. 1. As those of ordinary skill in the art will understand, the functions or steps represented by the block diagram may be performed by software and/or hardware. Depending upon the particular processing strategy, such as event-driven, interrupt-driven, etc., the various functions may be performed in an order or sequence other than illustrated in the Figures. Similarly, one or more steps or functions may be repeatedly performed, although not explicitly illustrated. In one embodiment, the functions illustrated are primarily implemented by software, instructions, or code stored in a computer readable storage medium and executed by a computer or control module to control operation of the vehicle. Various conventional sensors or actuators are represented generally by corresponding blocks of the Figures.

The vehicle system controller determines a desired engine torque as represented by block 201 in FIG. 2. Determination of a desired engine torque will depend on a number of considerations that may be application and implementation specific. For the representative embodiment of an HEV illustrated in FIG. 1, the desired engine torque represents the amount of torque to be delivered by engine 12 taking into consideration various ambient and vehicle operating conditions and/or modes that may include vehicle speed, engine speed, battery state of charge (SOC), accelerator pedal position, engine coolant temperature, motor current, cruise control status, emission control device status, engine idle mode, etc. The desired engine torque represented by block 201 is filtered or delayed as represented by block 104 to account for the physical properties of the engine intake manifold as represented by manifold-filling time constant 202. The filter or delay at 104 may incorporate various estimated or measured operating parameters such as barometric pressure, mass air flow, ambient temperature, and the like to approximate the dynamics of the intake manifold.

The filtered or delayed desired torque value is compared to a current engine torque feedback signal or value 108 determined from transmission 38 and/or motor 40 to generate a torque difference signal at block 106. Specifically a torque error is determined based on the desired torque relative to an actual torque. The torque difference value is then clipped or limited to a calibratable range as represented by block 110. In one example, this may include clipping an "error" term between maximum positive and maximum negative calibration limits. The adjusted torque may be a proportion-integral controlled difference between the desired engine torque and the actual engine torque wherein the difference is adjusted with a stored proportional term and a stored integral term. That is, the resulting torque value is then acted on by a proportional-integral (PI) controller 112 that includes a proportional term 120, an integral term 122, and a torque offset value 124 applied to integral term 122. PI controller 112 may include anti-windup (and/or wind-down) integrator control logic 150 that limits the integrator value to improve transient performance and transitions between operating modes. For example, integrator anti-windup logic may be used to prevent undesirable integrator values resulting from the requested torque exceeding the maximum available engine torque limit or those resulting from throttle limits (that is, when the throttle valve reaches an open or closed stop position).

Torque offset 124 includes logic 152 for continuously updating a corresponding offset value based on an engine speed range when the engine is operating at steady-state within a predetermined region or range of the minimum engine torque line. The torque offset value is determined responsive to an actual engine speed and engine load. In one embodiment, a torque offset is stored in a table in persistent memory, such as KAM 7, wherein torque offset 124 is mapped and stored across various engine speed and load ranges, and interpolated accordingly, as indicated in block 152. Specifically, the KAM may use a 3D interpolation map that is based on engine speed and load to determine the torque offset for the current operating conditions (e.g., for the current engine speed and load condition). The torque offset value is based on a rolling average of the previously stored value and a new value corresponding to a steady-state difference of the integral term 122. When the value is updated, integral term 122 is reset. During subsequent operation in the region near the minimum torque line, a torque offset corresponding to the current engine speed operating range is retrieved from memory and added to integral term 122. The torque offset value may be adjusted or ramped before being combined with the integral term with the adjustment or ramp based on the distance between the desired torque and the minimum torque as represented by block 152. The output of PI controller 112 is clipped or limited by maximum positive and maximum negative limits as represented by block 130. In this way, the torque error is adjusted using the stored torque offset value corresponding to an actual engine speed and load.

Additionally, in response to a tip-in or tip-out condition, wherein the rate of change of torque is higher than a threshold, each of the proportional term 120 and the integral term 122 may be cleared and reset to zero. In one example, the tip-in and/or tip-out condition may be detected by the VSC, as shown at block 170, by filtering the desired engine torque (201) and comparing the filtered torque to an instantaneous engine torque. In response to the absolute value of the rate of change in the desired torque being higher than a threshold, a tip-in or tip-out condition may be determined. Alternatively, the tip-in or tip-out condition may be inferred based on driver demand (e.g., based on a rate of change in a pedal position). By clearing out the proportional and integral terms of the PI controller 112 in response to a tip-in or tip-out condition, a faster control response to a transient change in engine torque may be possible, such as when transitioning away from, or towards, operation at or near a minimum airflow. Additionally, wind-up or wind-down of the integral from a large transient is prevented, further preventing overshoot or undershoot.

The output of block 130 is then combined with a desired engine torque feed forward (FF) term 134 at block 132. The output of block 132 is again compared to upper and lower limits and accordingly, a total desired air mass for producing the desired engine torque is clipped or limited as represented by block 140. The lower limit represents the engine torque at minimum load (herein also to referred to as a minimum torque required for maintaining combustion stability). This minimum torque may be determined as a function of engine coolant temperature as well as engine speed. In one example, the minimum torque may be a negative torque value (e.g., less than zero torque) but with combustion being carried out in all cylinders at stoichiometry. In the embodiment illustrated in FIG. 2, the minimum torque is stored in a lookup table accessed or indexed by engine coolant temperature and engine speed with the minimum torque having a higher value for lower temperatures to account for increased frictional losses and reduced combustion efficiency of the engine. This feature of the present invention helps to reduce or eliminate susceptibility to misfire for cold engines that may otherwise affect the emission control system. Likewise, the minimum torque may have a more negative value for higher engine speeds to provide improved deceleration control without concerns for an engine stall.

The adjusted and limited engine torque determined by block 140 is then used to control operation of the engine to produce the desired torque. In particular, this may include using air control during some conditions, such as when the desired torque is above the threshold torque (or above the torque available at threshold airflow), while using spark control during other conditions, such as when the desired torque is below the threshold torque (or below the torque available at threshold airflow).

In the embodiment illustrated in FIG. 2, airflow control is implemented by an electronic throttle control (ETC) with a throttle valve position determined in response to the determined airflow corresponding to the desired torque as represented by block 160. The ETC then uses feedback control to accurately position the throttle valve to achieve the desired airflow as represented by block 162. As elaborated in FIGS. 3-5, the air adjustment may include decreasing a throttle opening based on an adjusted torque error while maintaining spark at MBT before reaching a minimum airflow, and only upon reaching the minimum airflow, further maintaining torque by adjusting spark. Depending upon the particular application and implementation, airflow control may be achieved using other engine actuators. For example, throttleless engines and/or those with electronic valve actuation (EVA) may use intake and/or exhaust valve timing to control engine airflow. Similarly, engines may include a supercharger or turbocharger with boost controlled to modify intake airflow. As such, the present invention is independent of the particular engine technology used to affect the closed-loop torque control strategy.

Spark control may be implemented during specific conditions such as when the desired engine torque is less than the threshold torque, or torque when air is at minimum airflow. During such conditions, air flow may be maintained (e.g., by maintaining the throttle position) while spark is adjusted (e.g., retarded from MBT), as represented by block 160, in response to torque error in feedback control (not open loop). In this way, the VSC uses spark to control the engine torque in a closed loop when operating at torques below the minimum load. As elaborated in FIGS. 3-5, the spark adjustment may include retarding spark ignition timing from MBT based on the adjusted torque error while maintaining the throttle at a minimum airflow position. Operation and coordination of air flow control and spark control is illustrated and described in greater detail with reference to FIGS. 3-5.

As also illustrated in FIG. 2, the present invention includes detecting the rate of change of the desired engine torque requested by the VSC as represented by block 170. The rate of change may be determined by comparing the current desired engine torque to one or more previous values and filtering or averaging if desired. Monitoring the rate of change of the desired torque may be used to detect a rapid release of the accelerator pedal (herein also referred to as tip-out) as well as to detect a rapid application of the accelerator pedal (herein also referred to as a tip-in) so that spark or ignition timing may be used to rapidly adjust the engine torque output as represented by block 172. In addition, as previously elaborated with reference to block 171, in response to the detection of either a tip-in or a tip-out condition, the integral term and the proportional terms of the PI controller may be cleared. As such, this allows the controller's response time to transient changes in engine torque to be reduced. In this way, a faster and more accurate torque control is provided.

While the present invention is described with a torque feedback signal supplied by the transmission and/or motor of a hybrid vehicle, the invention may also be applied to conventional powertrain implementations with an estimated or measured torque feedback signal. Although currently available torque sensors are not commercially viable for automotive applications, a number of methods have been developed to accurately estimate an "actual" torque based on other sensors in combination with ambient and engine operating conditions and parameters as known by those of ordinary skill in the art.

In this way, the system of FIGS. 1-2 enables a method controlling vehicle torque wherein during non-idle speed engine combustion operation, the vehicle controller transitions from air adjustment to spark adjustment to maintain actual engine torque at a desired engine torque when operating at or near a minimum aircharge for combustion stability.

Figure 3:
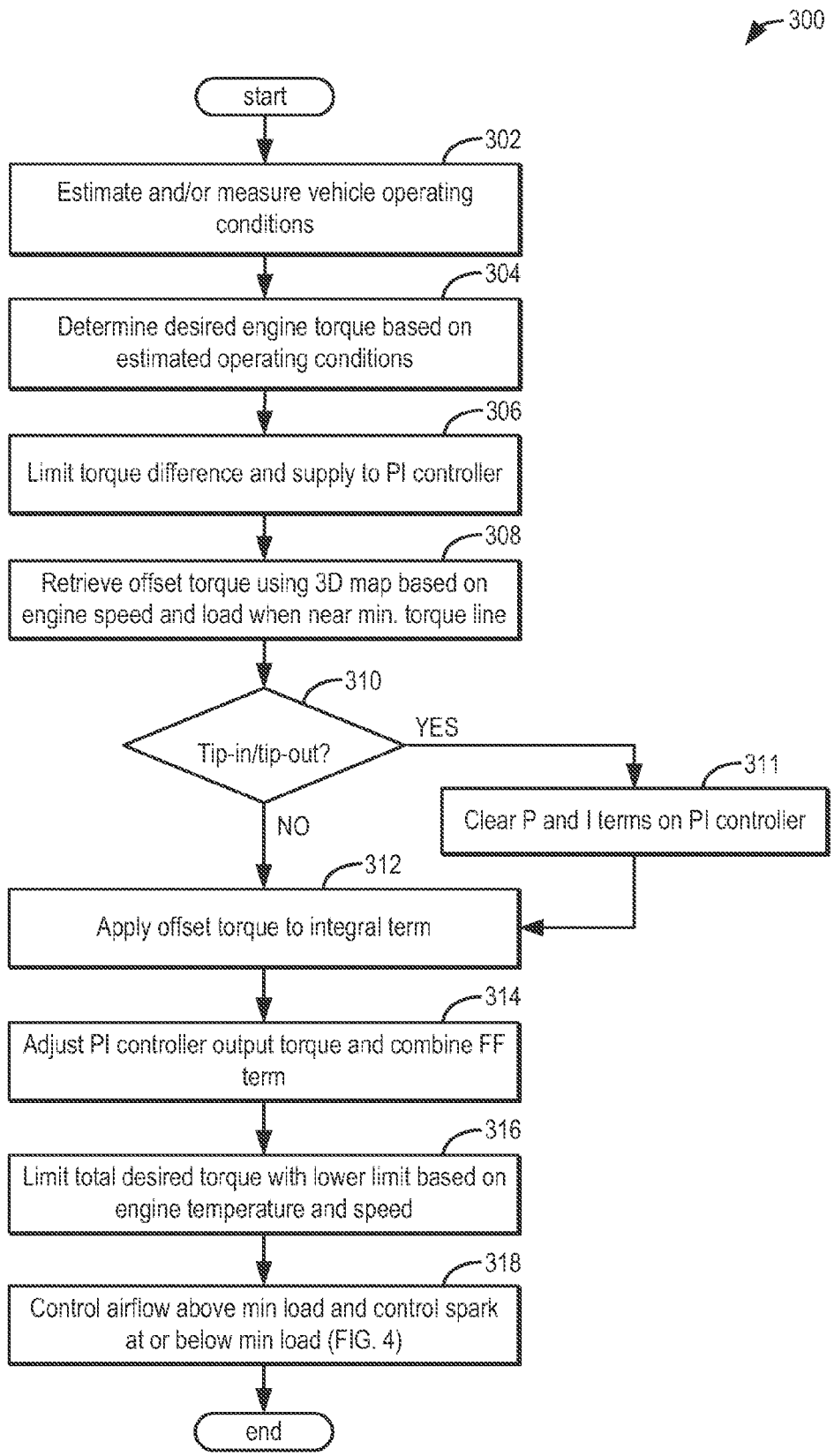
FIGS. 3-4 show example flowcharts for transitioning between airflow adjustments and spark adjustments to provide torque control when operating at or below a minimum aircharge required for combustion stability.
Figure 4:
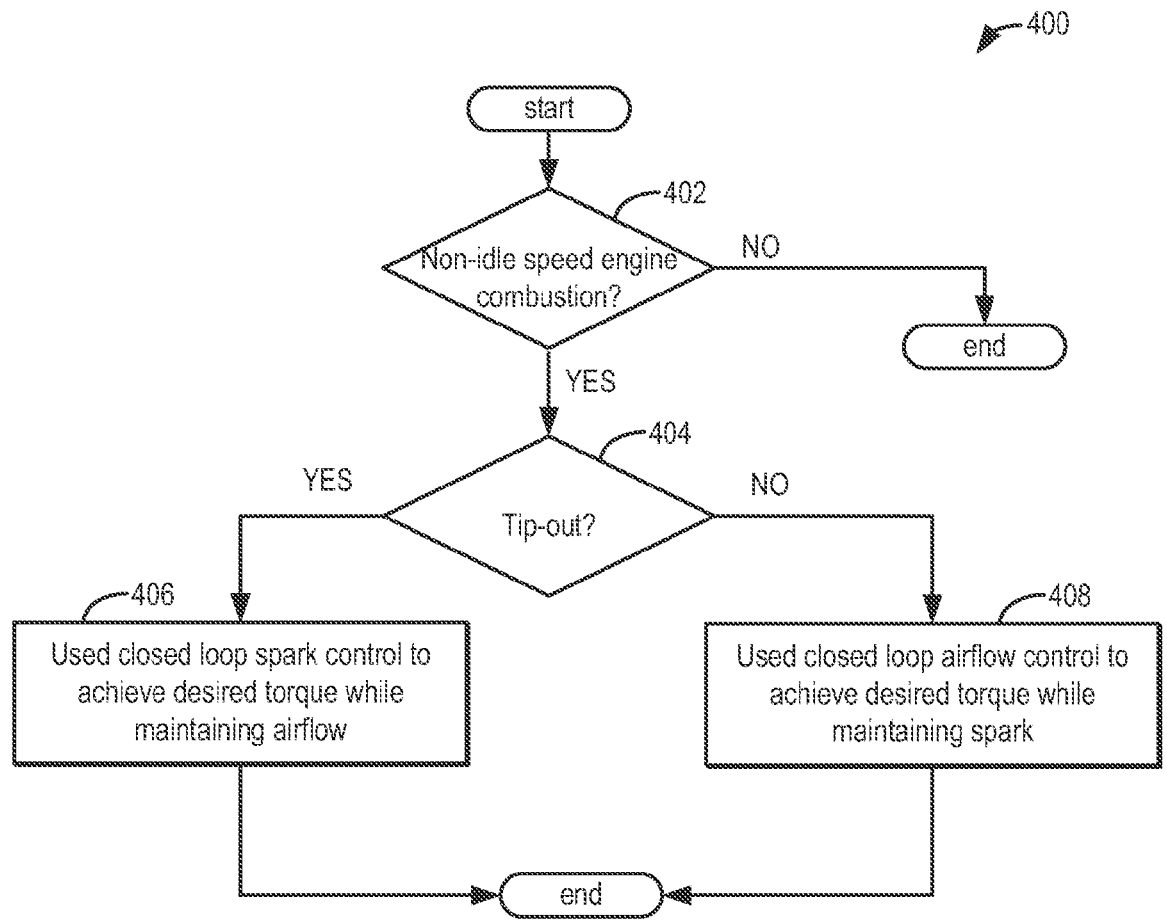

FIGS. 3-4 illustrate a method for controlling a vehicle powertrain so as to provide a desired torque with reduced torque errors. Similar to the previously described Figures, the flowcharts of FIGS. 3-4 generally represent functions performed by hardware and/or software. Depending upon the particular application and implementation, one or more blocks, steps, or functions may be repeated or continuously performed although not explicitly illustrated. Likewise, various steps or functions may be performed in a sequence different from that illustrated, be performed in parallel, and/or omitted while still providing the closed loop control features of the present invention.

At 302, vehicle operating conditions may be estimated and/or inferred. These may include, for example, desired torque, engine speed, accelerator pedal position, barometric pressure, engine temperature, battery state of charge, etc. At 304, a desired engine torque may be determined. The desired engine torque may be determined using various vehicle and operator sensors and/or actuators and take into consideration a number of engine, vehicle, and ambient operating conditions, such as those estimated at 302. The desired torque may be compared to a feedback signal or value representing the current torque being produced by the engine to generate a difference signal or value. At 306, the torque difference (or "error") may be clipped, or limited, to an acceptable range as determined by corresponding calibration values that determine an upper and lower limit. The limited value is then supplied to a controller, such as the PI controller. Although the embodiments selected to illustrate the present invention utilize a PI controller, it will be appreciated that various other control strategies may alternatively be used. For example, a proportional-integral-differential (PID) controller may be used.

When the engine is operating within a predetermined range of RPM and load, a stored torque offset value is retrieved. The torque offset value may be retrieved from a KAM of the controller, wherein the torque offset is stored as an interpolated map referenced by engine speed and load (as shown at block 152, item 3). In one embodiment, six engine speed ranges and six engine load ranges are used with a torque offset stored in persistent or non-volatile memory in a three-dimensional table or array indexed by the engine speed range, which spans 1000 rpm increments, and the engine load range, which spans 0.2 load increments. Depending upon the particular application and implementation, a greater or lesser number of torque offset values may be stored and/or indexed by a different operating parameter and/or multiple engine or vehicle operating parameters, for example.

At 310, it may be determined if an accelerator pedal tip-in or tip-out condition is present. In one example, the tip-in or tip-out condition may be determined based on an absolute value of a rate of change of the filtered desired torque being higher than a threshold rate. If a tip-in or tip-out condition is confirmed, then at 311, the proportional and integral terms stored in the PI controller may be cleared out and reset to zero. As such, by clearing out the terms, a response time to transient engine torque changes can be improved and overshoot or undershoot reduced. If no tip-in or tip-out condition has occurred, the method may proceed directly to 312.

At 312, the determined offset torque is applied to the determined integral term. At 314, the resulting output torque value from the PI controller is clipped or limited and combined with a feed-forward desired engine torque term. At 316, the resulting total desired engine torque term is again clipped or limited with the lower limit based on temperature (such as engine coolant temperature) and engine speed. This clipped or limited value is then used to control the airflow (as indicated by the airflow control path of FIG. 2) and spark timing (as indicated by the spark control path of FIG. 2) so that the engine produces the total desired torque at 318. As further elaborated with reference to FIG. 4, this closed-loop torque control may include a closed-loop control of airflow above minimum load conditions and a closed-loop control of spark timing at or below minimum load conditions. That is, at or below minimum load conditions, the air adjustment may be closed loop on torque and the spark adjustment may be closed loop on torque, but the air adjustment and the spark adjustment may be mutually exclusive.

Now turning to FIG. 4, method 400 includes, at 402, confirming whether non-idle speed engine combustion conditions are present. This may include vehicle speed being higher than a threshold speed and engine speed not being feedback controlled to a desired engine speed, for example, during a tip-in event or a tip-out event. As such, at idle speed engine combustion, the desired engine torque may be determined as a function of engine speed or load. At 404, it may be determined if the non-idle speed condition is a tip-out condition. If yes, then 406, closed-loop spark control may be used to achieve the desired torque while the airflow is maintained. In addition, fuel may be adjusted to maintain the desired air-to-fuel ratio. In one example, this includes retarding the spark timing from MBT while maintaining the airflow at minimum airflow. That is, during the closed-loop spark adjustment, the throttle is maintained at a minimum air charge position. If a tip-out is not confirmed, then at 408, closed-loop air control may be used to achieve the desired torque while the spark is maintained. In one example, this includes reducing the airflow (e.g., by reducing the opening of the throttle) while maintaining an amount of spark retard. Herein, the spark retard may correspond to zero so that MBT timing is used to maximize efficiency and fuel economy. For example, during the closed-loop air adjustment, spark ignition timing may be maintained at MBT until a minimum airflow is reached. Then, only after reaching the minimum airflow, spark timing may be adjusted to maintain the actual torque at the desired engine torque.

In this way, during non-idle speed engine combustion operation and responsive to a tip-out, a vehicle controller may transition from closed-loop air adjustment to closed-loop spark adjustment to maintain actual torque at a desired engine torque when operating at a minimum air charge for combustion stability.

Figure 5:
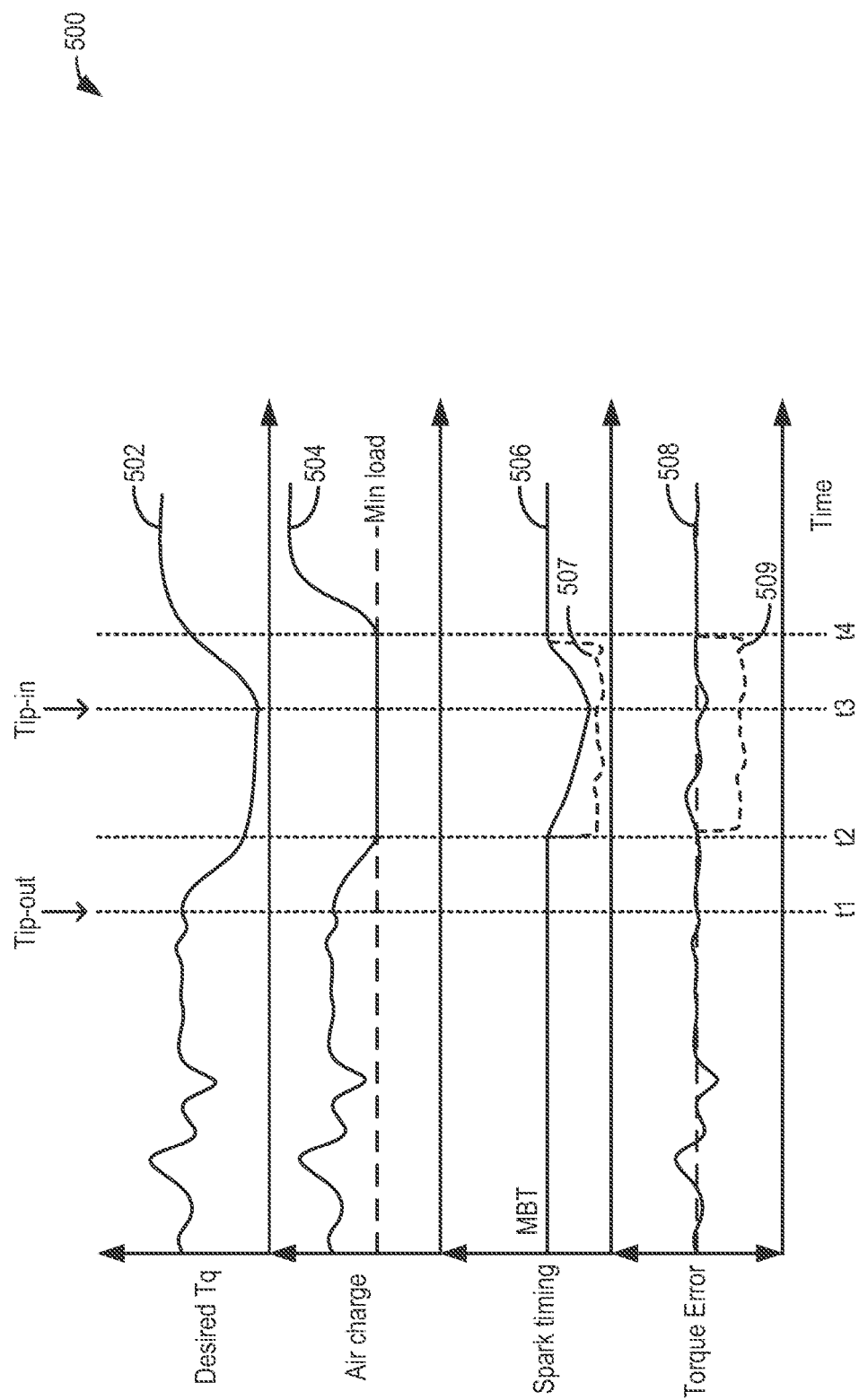
FIG. 5 shows an example transition from airflow-based torque control to spark-based torque control when operating below the minimum aircharge for combustion stability.

The adjustments of FIGS. 3-4 are further clarified using the example adjustment of FIG. 5. Map 500 of FIG. 5 depicts desired torque at curve 502, engine air charge (or air flow) at curve 504, engine spark ignition timing (relative to MBT) at curve 506, and a determined torque error at curve 508.

At any time over the duration of engine operation (along x-axis), an engine controller may determining a torque error (curve 508) based on the desired engine torque (curve 502) relative to an actual engine torque. The controller may then adjust the torque error using a stored torque offset corresponding to an actual engine speed and load. For example, the controller may determine a proportional-integral controlled torque error via application of a stored proportional term and a stored integral term that the controller retrieves during engine torque control.

Before t1, the controller may use an air adjustment to provide closed-loop torque control. In particular, the controller may be configured to closed-loop adjust a throttle position, and not a spark ignition timing, based on the adjusted torque error to provide the desired torque until a threshold airflow is reached.

At t1, a tip-out event may be determined based on a rate of change in the desired engine torque (e.g., based on the rate being higher than a threshold rate). In response to the tip-in, the controller may continue to provide closed-loop air adjustments for torque control. In addition, the controller may clear the stored proportional term and the stored integral term so that the response time and overshoot from wind-up for sudden torque transients can be reduced. As depicted, the controller may maintain the spark timing at MBT (from before t1 up till t2) while adjusting a throttle opening (reflected by the corresponding changes in air charge at curve 504) based on the torque error (curve 508) to provide the desired torque (curve 502). As such, this may continue until a threshold air flow is reached at t2. In the depicted example, the threshold airflow is a minimum airflow ("min load" represented by dashed lines) below which engine combustion stability is limited.

At t2, after the minimum air flow is reached, the engine torque control may transition to closed-loop adjusting of a spark ignition timing, and not a throttle position, based on the adjusted torque error to provide the desired torque below the threshold airflow.

At t3, a tip-in event may be confirmed. In response to the tip-out event, the controller may reset the stored proportional term and the stored integral term to zero. The controller may then continue the closed-loop adjusting of the spark ignition timing up to and including torque at the minimum airflow (that is, "min load") at t4. Then, when the threshold airflow is reached at t4, the controller may transition back to performing further torque adjustments (after t4) via closed-loop air control.

As such, if a transition between a mutually exclusive closed-loop air flow adjustment to achieve torque control and a closed-loop spark adjustment to achieve torque control were not performed (dashed curves 507 and 509), torque may be clipped at a minimum torque. Consequently, more or less torque than is required may be provided resulting in substantially larger torque errors (see dashed curve 507) and significantly more spark retard than may be needed (see dashed curve 509) to stay within combustion stability limits. Consequently, fuel may be wasted during those conditions and fuel economy may be degraded.

In this way, a robust closed-loop torque-based powertrain control is provided that enables engine torque to be accurately controlled, even when the engine is operating with engine loads at or below combustion stability limits. By adjusting and learning an adaptive torque offset value based on an engine speed and load range, and using the offset value to control engine torque when operating near the combustion stability limit, less spark retard is required due to the use of feedback torque control at minimum airflow. By using spark control to rapidly respond to accelerator pedal tip-out, a response time to engine torque transients can be improved. Additionally, overcharging of a system battery in HEV applications may be reduced because the torque is better controlled to a lower desired torque value. By selecting the minimum operating torque parameter based on temperature and engine speed, the approach is able to better account for weaker combustion at cold engine temperatures, thereby improving engine combustion stability.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling vehicle torque, comprising:
controlling vehicle speed during engine combustion operation while engine speed is not being feedback controlled, and
transitioning from air adjustment to spark adjustment to maintain actual engine torque at a desired engine torque when operating at or near a minimum aircharge for combustion stability.

2. The method of claim 1, wherein the vehicle is a hybrid electric vehicle.

3. The method of claim 1, wherein the controlling vehicle speed during engine combustion operation while engine speed is not being feedback controlled includes a tip-out event and a tip-in event.

4. The method of claim 1, wherein the air adjustment includes decreasing a throttle opening based on an adjusted torque error while maintaining spark at MBT before reaching a minimum airflow, and only upon reaching the minimum airflow, further maintaining torque by adjusting spark.

5. The method of claim 4, wherein the spark adjustment includes retarding spark ignition timing from MBT based on the adjusted torque error while maintaining a throttle at a minimum airflow position.

6. The method of claim 5, wherein the adjusted torque error is based on a difference between the desired engine torque and the actual engine torque, and further based on a stored torque offset, the offset corresponding to an actual engine speed and load.

7. The method of claim 6, wherein the adjusted torque error based on the difference includes the adjusted torque error being based on a proportional-integral controlled difference wherein the difference is adjusted with a stored proportional term and a stored integral term.

8. The method of claim 7, wherein in response to a tip-in or a tip-out event, each of the proportional term and the integral term is reset to zero.

9. The method of claim 1, wherein the air adjustment is closed loop on torque, and wherein the spark adjustment is closed loop on torque.

10. The method of claim 9, wherein the air adjustment and the spark adjustment are mutually exclusive.

11. A method of controlling vehicle torque, comprising:
controlling vehicle speed during engine combustion operation while engine speed is not being feedback controlled and responsive to a tip-out, and
transitioning from closed-loop air adjustment to closed-loop spark adjustment to maintain actual torque at a desired engine torque when operating at a minimum air charge for combustion stability.

12. The method of claim 11, wherein during the closed-loop air adjustment, spark ignition timing is maintained at MBT until a minimum airflow is reached.

13. The method of claim 12, further comprising, after reaching the minimum airflow, spark timing is adjusted to maintain the actual torque at the desired engine torque.

14. The method of claim 13, wherein during the closed-loop spark adjustment, a throttle is maintained at a minimum air charge position.

15. The method of claim 11, wherein the vehicle is a hybrid-electric vehicle.

16. The method of claim 11, wherein each of the closed-loop air adjustment and closed-loop spark adjustment is based on a torque offset value, the torque offset value determined responsive to an actual engine speed and actual engine load.

17. A system for controlling a vehicle powertrain comprising:
an engine;
a transmission;
an electric machine coupled to the engine via a gearset;
a battery configured to power the electric machine;
a controller having computer readable instructions for:
determining a torque error based on a desired engine torque relative to an actual engine torque;
adjusting the torque error using a stored torque offset corresponding to an actual engine speed and load;
closed-loop adjusting a throttle position, and not a spark ignition timing, based on the adjusted torque error to provide the desired torque until a threshold airflow is reached, wherein the threshold airflow is a minimum airflow below which engine combustion stability is limited; and
closed-loop adjusting a spark ignition timing, and not a throttle position, based on the adjusted torque error to provide the desired torque below the threshold airflow.

18. The system of claim 17, wherein the closed-loop adjusting of a spark ignition timing is performed down to and including torque at a minimum airflow.

19. The system of claim 17, wherein the determining a torque error includes determining a proportional-integral controlled torque error via application of a stored proportional term and a stored integral term, and wherein the controller includes instructions for clearing the stored proportional term and the stored integral term in response to one of a tip-in and a tip-out event.

* * * * *